Sept. 15, 1970     R. W. BUSHMEYER     3,528,504
TENSIONING MEANS FOR PLOW TRIP

Filed Aug. 24, 1967     4 Sheets-Sheet 1

INVENTOR.
RICHARD W. BUSHMEYER.
BY
WILSON, SETTLE & BATCHELDER.
ATT'YS.

INVENTOR.
RICHARD W. BUSHMEYER.
BY
WILSON, SETTLE & BATCHELDER.
ATT'YS.

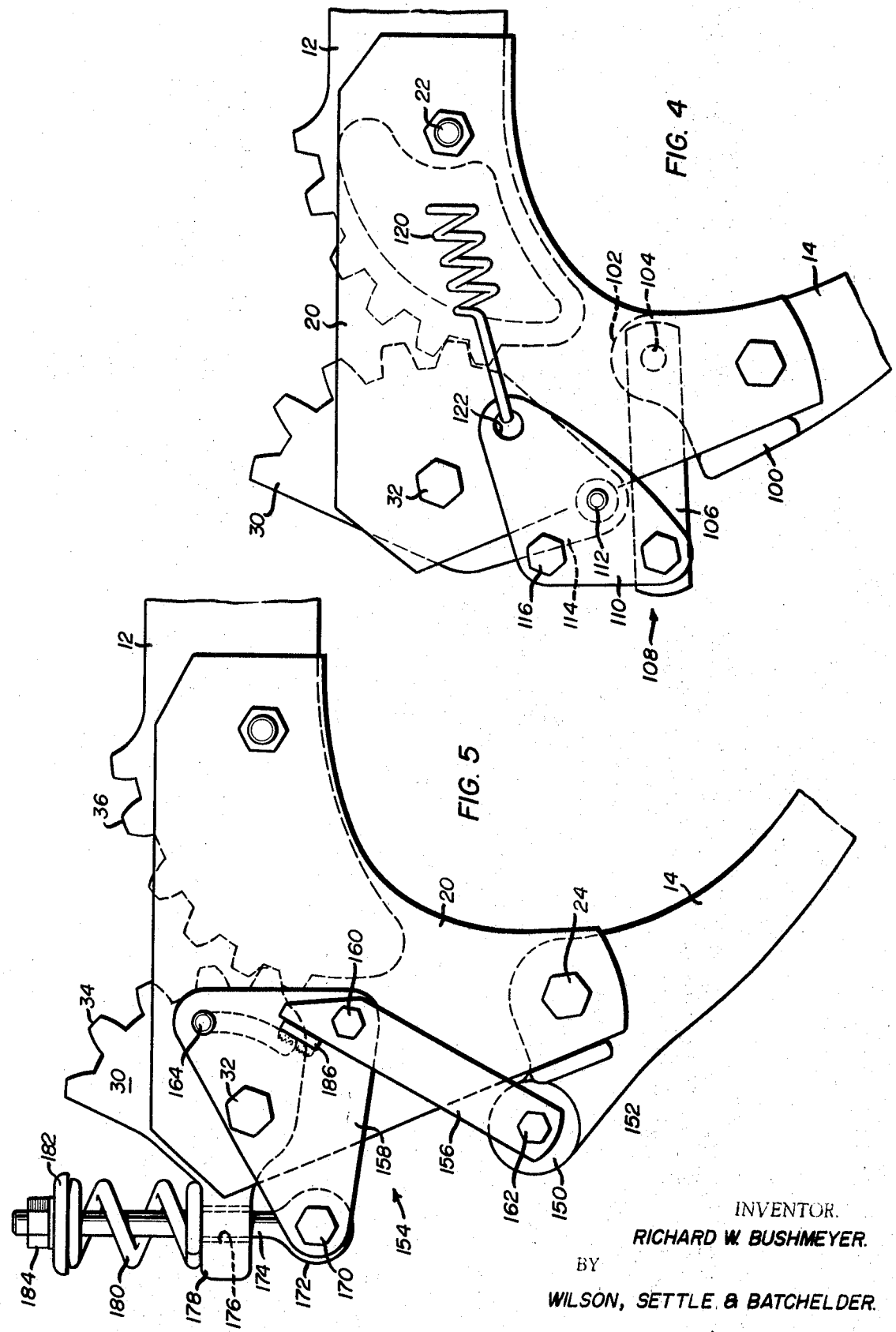

INVENTOR.
RICHARD W. BUSHMEYER
BY
WILSON, SETTLE & BATCHELDER.
ATT'YS.

United States Patent Office 3,528,504
Patented Sept. 15, 1970

3,528,504
TENSIONING MEANS FOR PLOW TRIP
Richard W. Bushmeyer, Rockford, Ill., assignor to J. I. Case Company, Racine, Wis., a corporation of Wisconsin
Filed Aug. 24, 1967, Ser. No. 662,941
Int. Cl. A01b 61/04
U.S. Cl. 172—264                                11 Claims

ABSTRACT OF THE DISCLOSURE

An implement having an earth working tool attached to a main beam of the implement through a release and cushioning mechanism. The mechanism includes two sections pivotally interconnected with one section rotatable on the main beam and carrying a motion transmitting means for rotating that section on the main beam. The transmitting means includes a drive member and linkage interconnecting the second section with the drive member and springs coacting with the linkage which resiliently maintain the mechanism in operative position while yielding when excessive force is applied to the implement.

BACKGROUND OF THE INVENTION

The present invention relates generally to agricultural implements and more particularly to an improved tripping and cushioning mechanism interposed between the earth working tool and the main frame of an implement.

Damage of earth working tools by abnormal draft forces caused by striking obstruction, such as roots, stones, etc., has been an age old problem. Many types of devices have been incorporated in agricultural equipment to compensate for shock loads on the implement caused by abnormal draft forces on the earth working tools.

However, increased horse power in tractors has resulted in larger implements, such as plows, with an increased number of plow bottoms in a single unit.

Thus, the more recent developments in release mechanisms for mold board plows have been to incorporate individual spring mechanisms for each plow bottom that could be operated independently of any of the other plow bottoms. Most of the more recent developments include a mechanism which develops a predetermined force counteracting the normal draft force applied to the working tool of the implement. When an excessive force is applied to the working tool, the counter-balancing force will be overcome thus allowing the mechanism to trip and allowing the plow bottom to move out of the soil.

The primary problem with the more recent devices is that either an excessive spring force has to be incorporated in the tripping mechanism to return the tripping mechanism to the normal operating position after an obstruction is passed or the mechanism does not include any arrangement which will automatically reset the plow bottom to the operating position. The latter problem of course necessitates stopping the implement and having the operator return the trip mechanism and the plow bottom to its operative position or to reverse the direction of the implement to utilize the ground for resetting the plow bottom.

While several proposals have been made for automatically resetting the tripping mechanism after an obstruction has been passed, these developments have been very costly and have not proven satisfactory in use.

SUMMARY OF INVENTION

The tripping and cushioning mechanism of the present invention incorporates a pair of pivots which allow the mechanism to be collapsed in a first direction about one pivot when a first type of obstruction is encountered while pivoting as a unit about the second pivot when a second type of obstruction is encountered. The tripping and cushioning mechanism also includes motion transmitting means interposed between the mechanism and the support frame of the implement having a linkage connected to the tool supporting standard. The specific arrangement of parts adapts the unit to be capable of resisting a large draft force with a relatively small spring force incorporated in the mechanism. The mechanism also will return the earth working tool to a favorable position for re-entry into the ground immediately after an obstruction is passed and is capable of returning the earth working tool to its operating position from any position without the mechanism moving to its completely tripped position.

Thus, the primary object of the present invention is to provide an improved tripping and cushioning mechanism for an earth working implement which is highly effective in balancing a large draft force on the implement with a very small counteracting force.

Another object is to provide a tripping and cushioning mechanism having a simple and efficient transmitting and biasing means for actuating the mechanism whenever an abnormal draft force is encountered.

Other objects and advantages of this invention will be apparent to those skilled in the art after a consideration of the following detailed description taken in conjunction with the accompanying drawings, wherein:

FIG. 4 is a view similar to FIG. 1 showing a modified form of a tripping and cushioning mechanism;

FIG. 5 is a view similar to FIG. 4 showing another modified tripping and cushioning mechanism;

Before expaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed therein is for the purpose of description and not of limitation.

Figure 1:
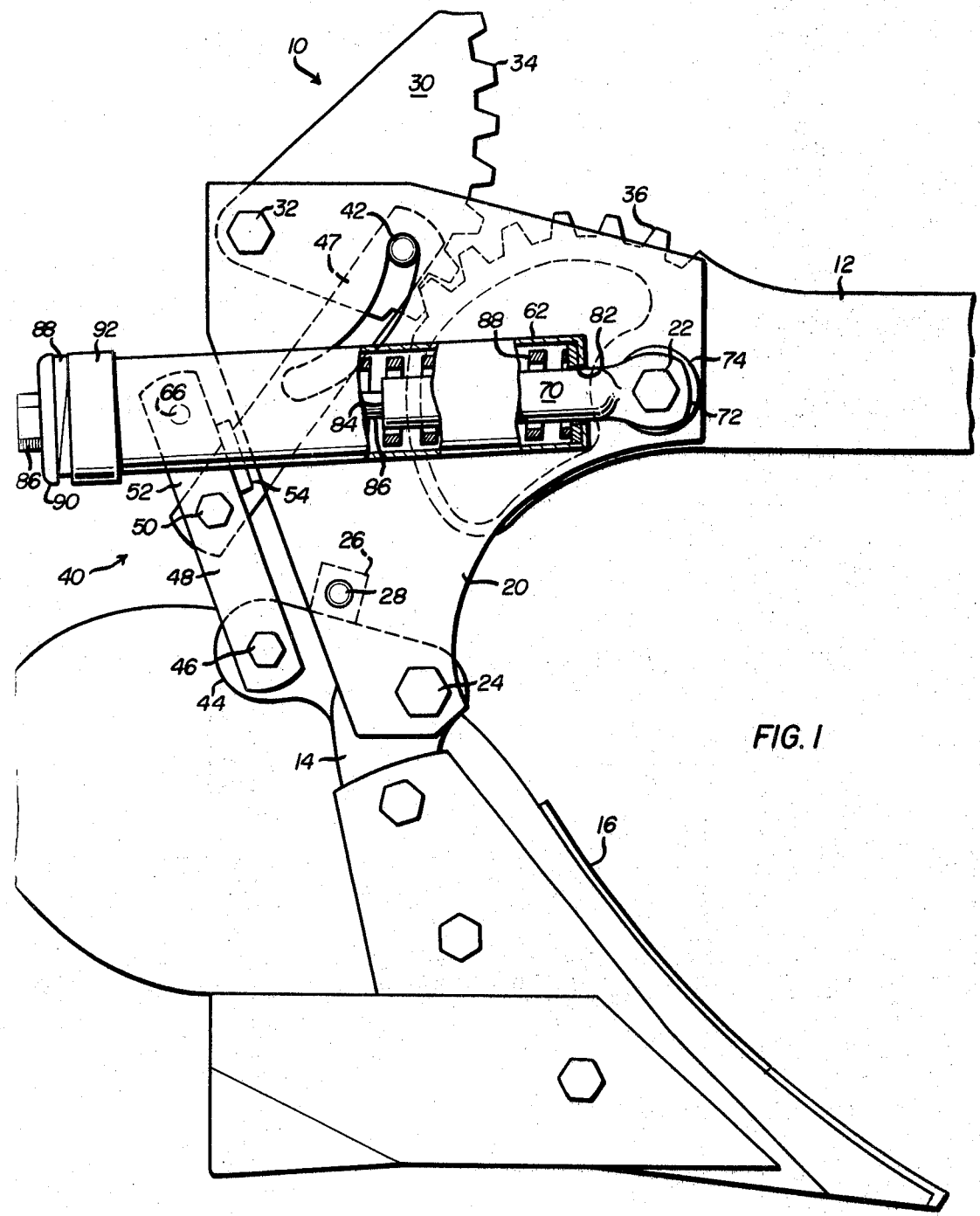
FIG. 1 is a fragmentary side elevation view of an earth working implement, incorporating the principles of this invention and shown in the normal working position.

Referring now to the drawings wherein like parts are referred to by identical reference numbers, FIG. 1 shows one embodiment of the tripping and cushioning mechanism, generally designated at 10, incorporated in an earth working implement, such as a mold board plow. The implement includes a fixed frame or main beam 12 and a plow standard 14 having a plow bottom 16 attached thereto. While only one plow bottom is illustrated in the drawings, it is to be understood that the tripping and cushioning mechanism is particularly adapted to be used with a multibottom plow of the heavy duty type with each plow bottom attached to its main beam by a separate tripping and cushioning mechanism.

The tripping and cushioning mechanism 10 includes a pair of support plates 20 disposed on opposite sides of the main beam 12 adjacent the rear end thereof and pivotally carried by a bolt or pin 22 defining a main pivot axis for the mechanism 10. The pair of plates 20 may be termed the upper section or member rotatably mounted on the main beam.

The standard 14 is pivotally supported between the two plates adjacent the lower end thereof on a pin 24 extending through the two plates. The pin or bolt 24 defines a second or secondary pivot of the tripping and cushioning mechanism.

The spaced plates 20 also include a stop 26 intermediate the adjacent surfaces thereof which is held in a fixed position relative to the plates by a bolt 28 passing through apertures in the stop, as well as the two plates. The stop 26 limits the clockwise rotational movement of the plow standard 14 about the secondary pivot 24, for a purpose to be described later.

The mechanism 10 has motion transmitting means comprising a quadrant gear 30 supported for pivotal movement on a bolt 32 extending between the two plates 20. The quadrant gear has teeth 34 which are in constant mesh with corresponding gear teeth 36 formed on an integral extension of the main beam or support frame 12.

A toggle linkage 40 is connected by a pin 42 to the member or gear 30 and also connected to an extension 44 on the plow standard by a second pin 46. The toggle linkage 40 is capable of transmitting the movement of the lower section or standard 14 to the quadrant gear 30. As clearly shown in FIG. 1, the toggle linkage includes first and second pairs of links 47, 48 which are pivotally interconnected with each other by a pin 50. In the embodiment illustrated in FIGS. 1 through 3, the links 48 each include an extension 52 while the links 47 have a stop 54 adapted to be engaged by the extension 52.

The linkage is biased to a first position wherein the extension 52 engages the stop 54. The biasing means of the embodiment illustrated in FIGS. 1 and 2 includes a pair of spring assemblies 60 which are identical in construction and only one will be described in detail. Each spring assembly 60 includes a housing 62 having an apertured boss 64 fixedly secured to a portion of the outer peripheral surface thereof. The apertured boss 64 receives the end of the pin or bolt 66 which is received through an aperture on the extension 52 of the link 48. A single bolt, is utilized for connecting both of the assemblies 60 to the respective link extensions 52 and preferably, a spacer 68 (FIG. 2) is provided intermediate the adjacent surfaces of the link extensions 52 to properly space these members.

Each spring assembly 60 further includes a rod 70 (FIG. 2) having an apertured end 72 through which the bolt 22, defining the main pivot, is passed. Suitably configured spacers 74 are telescoped on the bolt 22 to properly locate the apertured end 72 relative to the remaining portion of the assembly.

The housing 62 is substantially completely enclosed at one end thereof by a plate 80 having an opening 82 through which the rod 70 extends. The free end of the rod 70 is provided with an internally threaded opening 84 which threadedly receives the end of a stud 86. A compression spring 88 is telescoped over the portion of the rod extending into the housing 62 and has one end in engagement with the plate or end closure 80. The opposite end of the spring 88 is in engagement with a surface of a washer 90 hich is received on the stud 86.

Thus, by rotating the stud 86 in the appropriate direction, the effective spring force of the compression spring 88 can readily be varied. If desired, the free ends of the two housings 62 can be interconnected by clamps 92 interconnected by a common bolt 94.

OPERATION OF FIGS. 1 THROUGH 3 EMBODIMENT

The operation of the tripping and cushioning mechanism described above is as follows:

The plow bottom or earth working tool 16 is normally maintained in the earth working position shown in FIG. 1 when normal draft forces are applied to the plow bottom. This is accomplished by the spring assembly 60 forcing the toggle linkage 40 into the position shown in FIG. 1 with the link extension 52 in engagement with stop 54. In this position, the plow standard extension 44 is maintained against the stop 28 by the soil forces acting on the plow bottom 16.

Assuming that the ploy bottom encounters an earth bound obstacle, such as a stone, which produces an abnormal draft force on the upper surface of the bottom, the plow standard or lower section 14 and the upper section, defined by plates 20, will rotate as a unit about the main pivot point 22 since the stop 28 will prevent any clockwise pivotal movement of the standard 14 about pivot pin 24. This will occur when the force on the upper surface of the plow bottom 16 is sufficient to overcome the spring force produced by the respective compression springs 88. As the upper and lower sections 20, 14 move or rotate as a unit about pivot 22, the intermeshing teeth 34, 36 will cause the member 30 to rotate in a clockwise direction about the pivot 32. This will move the pins 42, 46 toward each other thus, collapsing the toggle linkage 40. The collapsing movement of the toggle linkage 40 will move the end of the extension 52 away from the pivot pin 22 thereby increasing the force produced by the springs 88.

When the obstruction is passed by the plow bottom thus reducing the draft force to a normal draft force, the spring force on the link extensions 52 will move the toggle linkage to its original position shown in FIG. 1 thus positioning the standard 14 and the plow bottom to a favorable position for re-entry into the ground. Since the spring force produced on the end of extension 52 is sufficient to overcome the normal draft force on the plow bottom, the springs will tend to move the member 30 to its original position shown in FIG. 1. Of course, it is readily understood that this condition will occur immediately after the abnormal draft force is removed from the plow bottom. Thus, any time the obstruction is passed, the tripping mechanism will automatically return the plow bottom to its normal earth working position relative to the main beam from any partially or fully tripped position.

As mentioned above, the tripping and cushioning mechanism is also capable of yielding to excessive or abnormal upwardly directed forces applied against the lower surface of the plow bottom 16, as when the plow bottom encounters an obstruction which will exert the upward force on the plow bottom. Thus, when the plow bottom strikes an obstruction which produces an abnormal draft force on the lower surface of the bottom, the plow standard or lower section 14 will pivot counterclockwise about the pin 24. This pivotal movement of the lower section 14 will be transmitted through the linkage 40 to the member or gear 30 thereby causing the upper section or plates 20 to pivot in a clockwise direction about the pin 22 due to the intermeshing of the gear teeth 34 and 36.

During the counterclockwise rotational movement of the plow standard 14 on the secondary pivot 24 and the clockwise pivotal movement of the plate 20 about pin 22, the linkage 40 will be moved as a unit and will thus increase the compression of the spring 88. When the pow bottom passes the obstruction, the abnormal draft load force will be removed thus allowing the action of the springs 88 to immediately move the member or gear 30 to its original position. This counterclockwise movement of the member 30 will likewise pivot the plates 20 counterclockwise about pin 22 thus returning the entire trip mechanism to its earth working position shown in FIG. 1.

As can readily be appreciated, the provision of the gear or drive means between the main beam and the plates or upper section 20 as well as the toggle linkage connection between the drive means and the lower section or plow standard will balance the torque reactions about the main and secondary pivots thereby making it possible to use a very small spring force in the tripping mechanism which is readily capable of overcoming a large normal draft load on the plow bottom. Furthermore, returning or pivoting the lower section or plow standard to a favorable re-entry position immediately after an obstruction is passed will also eliminate the necessity for a large spring force that has heretofore been required to return the plow bottom to its earth working position.

FIG. 4 EMBODIMENT

The modified tripping and cushioning mechanism of FIG. 4 includes stop 100 formed integral with the rear upper end of the plow standard 14 which is in engagement with the rear edges of the spaced plates 20 when the plow bottom is in its normal operating position. The plow standard also includes a bifurcated extension 102, the legs of which are apertured to receive a pin 104 pivotally securing one end of a link 106 to the plow standard 14. The link 106 forms a part of the linkage 108 which also includes two first links 110 that are generally triangularly configured. The links 110 are pivotally connected intermediate their ends by a pin 112 to an extension 114 formed integral with the member or gear 30. The two links 110 are also interconnected with each other by a second pin 116 which defines a stop that is adapted to engage a recess formed on the member extension 114.

The linkage 108 is biased to the position shown in FIG. 4 with the pin or stop 116 in engagement with the extension 114. This is accomplished by a pair of tension springs having one end respectively received in an aperture 122 provided in the links 110 while the opposite ends are fixedly secured (not shown) to the bolt or pin 22.

Since the embodiment described and shown in FIG. 4 is identical in operation to that previously described, it is believed that no further detailed description of the operation is necessary.

FIG. 5 EMBODIMENT

Figure 2:
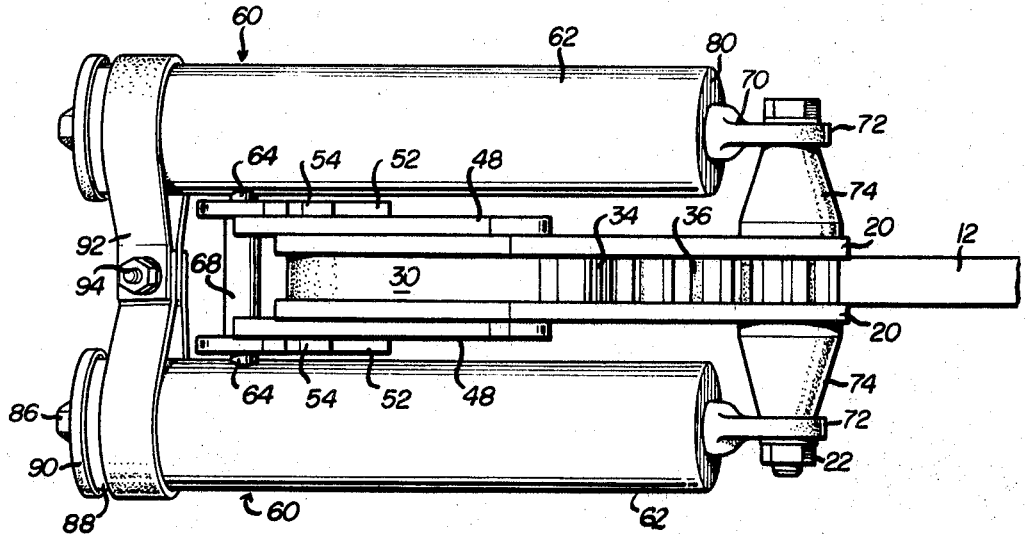
FIG. 2 is a plan view of the mechanism shown in FIG. 1.
Figure 3:
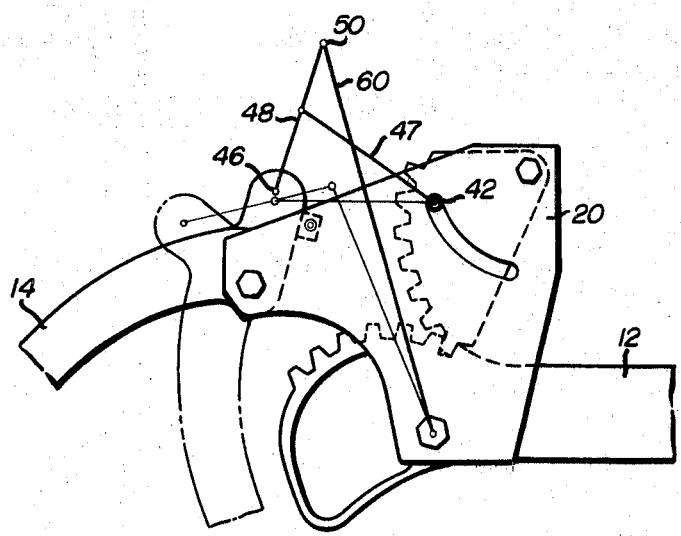
FIG. 3 is a side elevational view showing the tripping mechanism in its fully tripped position.

A further modified embodiment of the tripping mechanism 10 shown in FIGS. 1 through 3 is shown in FIG. 5 and like numerals are utilized to indicate like parts. The plow standard 14 in the FIG. 5 embodiment includes an extension 150 extending rearwardly of the spaced plates 20 and having a stop 152 defined thereon which engages the rear edges of plates 20 to limit the clockwise rotational movement of the standard 14 about the pivot 24. A toggle linkage 154 includes links 156 and 158 pivotally interconnected to each other by pivot bolts 160. The two links 156 disposed adjacent opposite outer surfaces of the plates 20 are connected to the extension 150 by a common pin or bolt 162.

The upper links 158 of the toggle linkage 154 are generally triangular in shape and have one end connected to the gear 30 by a single pin or bolt 164. The pin or bolt is guided in slots defined in the respective plates 20 to allow pivotal movement of the gear 30 about the pin 32.

The extensions of the links 158 have apertures therein which receive a pin 170 connecting the apertured end 172 of a rod 174 thereto. The rod extends through an enlarged opening 176 formed in an extension 178 which is integral with the gear or member 30.

A spring 180 is telescoped over the upper end of the rod 174 and has one end in engagement with a surface of the extension 178. The opposite end of the spring engages a washer 182 telescoped on the rod and retained thereon by a nut 184 threadedly received on the free end of the rod.

Thus, it is readily apparent that rotation of the nut 184 in the appropriate direction will readily vary the compressive force of the spring 180 and thus produce the desired spring force for the mechanism. Stops 186 defined on the links 158 will limit the pivotal movement of the links 156 and 158 relative to each other in one direction to thus maintain the pivot pins 160 on one side of the common plane defined by the two pivot pins 162 and 164.

Of course, the operation of the embodiment shown in FIG. 5 is substantially identical to that described in detail hereinabove with particular reference to FIGS. 1 and 3 and a detailed description of the operation does not appear to be necessary.

FIG. 6 EMBODIMENT

Figure 6:
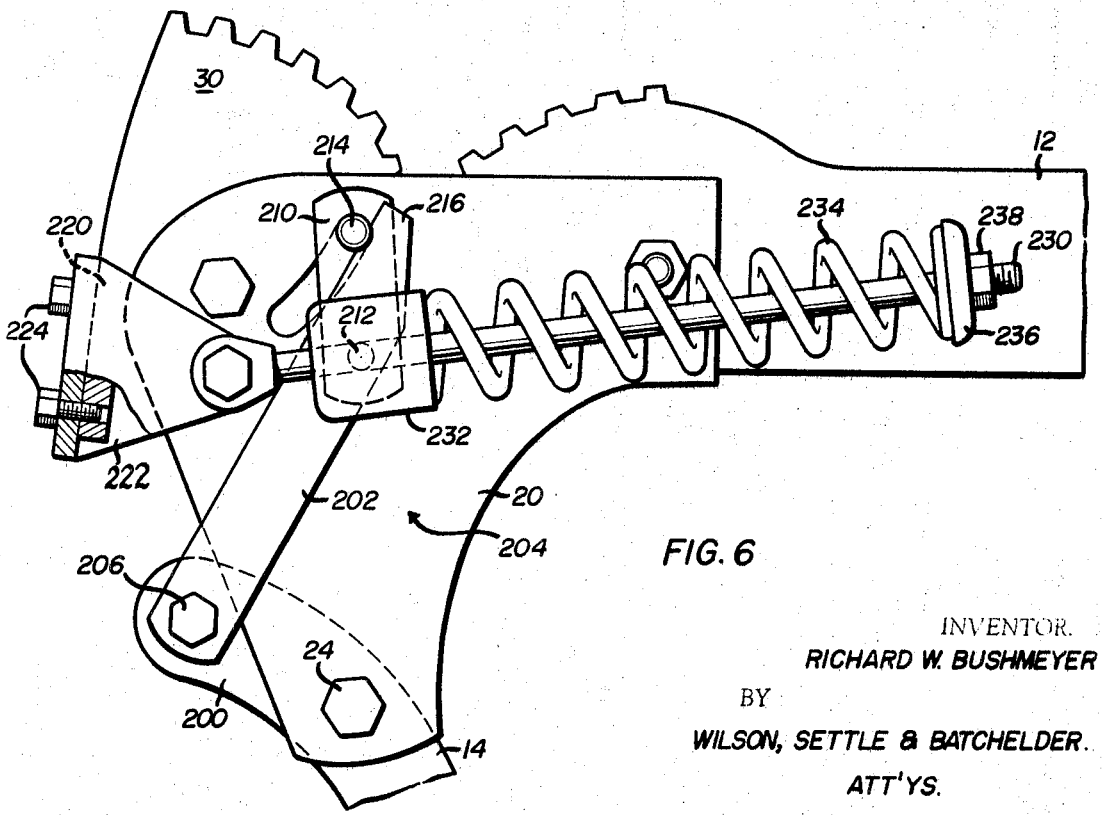
FIG. 6 is a view similar to FIG. 4 showing a further modified tripping and cushioning mechanism.

In the embodiment illustrated in FIG. 6, the plow standard 14 is provided with an integral extension 200. The two links 202 respectively forming part of the toggle linkages 204 are connected to the extension by a common pin or bolt 206. The links 202 are respectively interconnected to second links 210 by bolt 212 and the free ends of the second links 210 are connected to the member or gear 30 by a single pin 214 which again is movable in arcuate slots defined in the plates 20. The links 202 include extensions 216 which each have a recess in alignment with the pin 214 to limit the relative pivotal movement of the respective links about the pin 212 in one direction.

The gear or member 30 includes an extension 220 which extends beyond the rear ends or edges of the respective plates 20 and has a U-shaped bracket 222 secured thereto by bolts 224. Each of the legs of the U-shaped bracket has a rod 230 (only one being shown) connected thereto. Each rod 230 extends through an enlarged aperture defined on a bracket 232 fixedly secured to the bolt or pin 212. A spring 234 is telescoped over each rod and has one end in engagement with the bracket 232 while the opposite end engages a washer 236 telescoped over the free end of the rod 230 and retained thereon by a nut 238 threadedly received on the end of the rod.

For a detailed description of the operation of the embodiment shown in FIG. 6, reference may be had to the detailed description of the operation of the FIGS. 1 through 3 embodiment.

FIG. 7 EMBODIMENT

Figure 7:
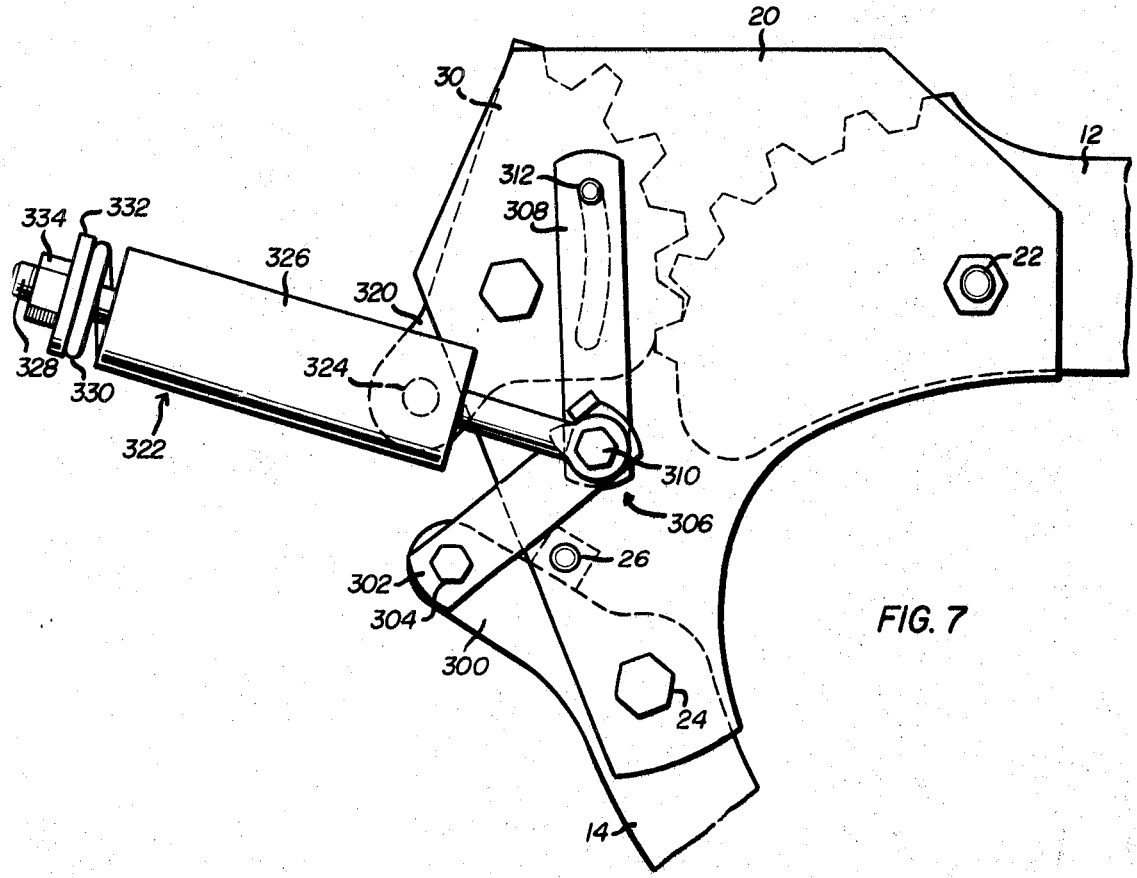
FIG. 7 is a view similar to FIG. 4 showing still another modified form of tripping and cushioning mechanism of the invention.

The plow standard 14 shown in FIG. 7 includes an integral extension 300 to which a pair of links 302 are connected by a single bolt 304. Each of the links 302 form the first link of a toggle linkage 306 which also includes a second link 308 pivotally connected to the opposite end of the link 302 by a pin 310. The opposite free ends of the links 308 are connected by a common bolt 312 to the gear or member 30 with the bolt being movable in the arcuate slots defined in the plates 20.

The gear member includes an integral extension 320 which extends beyond the rear edge of the respective plates 20 and has a pair of spring assemblies 322 (only one being shown) connected thereto by a pin 324. Each spring assembly includes a spring housing 326 which is fixedly secured adjacent one end to the pin 324 and receives a rod 328. Each rod 328 has one end connected to the pin 310 and has a compression spring 330 telescoped thereon. One end of the spring engages an enclosed end of the housing 326 while the second end of the spring is in engagement with a washer 332 telescoped over the rod 328 and retained thereon by a nut 334 threadedly received on the end of the rod.

Again the operation of the FIG. 7 embodiment is identical to that described with reference to FIGS. 1 through 3 and a detailed description thereof does not appear to be necessary.

In all of the embodiments illustrated and described hereinabove, the tripping and cushioning mechanism is capable of yielding to any abnormal forces which may be applied to the plow bottom. Also, when the abnormal draft force is overcome, the plow bottom will be returned to a favorable position for re-entry into the ground. Furthermore, the specific arrangement of parts requires a relatively small or minor spring force since the torque reactions about the upper and lower pivot points 22, 24 are balanced at any position during the tripping or cushioning cycle.

Of course, the small required pre-load on the springs is of extreme importance in designing a tripping and cushioning mechanism since this will considerably reduce the cost of manufacturing as well as provide a more accurate system which will trip or yield to predetermined abnormal draft forces on the implement.

While several preferred embodiments have been shown and described, it will be readily apparent to those skilled in the art that the invention may be embodied in other specific forms without departing from the spirit or essential characteristics thereof. The present embodiments are therefore to be considered in all respects as illustrative.

I claim:

1. In an implement having a main beam, an earth working tool and a release and cushioning assembly connecting said tool to said main beam for maintaining said tool in an earth working position relative to said beam when normal draft forces are applied to said tool, said assembly comprising an upper section rotatably mounted on a main pivot adjacent one end of said beam, a tool supporting lower section pivoted on said upper section, and motion transmitting means including a member pivoted on said upper section and having a portion in driving engagement with said end of the beam, a toggle linkage including first and second links pivotally interconnected and respectively connected to said member and said lower section for transmitting movement of said lower section to said member thereby rotating said upper section about said main pivot, and biasing means acting on said toggle linkage for resiliently retaining said tool in the earth working position and operable to yield in response to abnormal draft forces on said tool to allow (1) said lower section to pivot about said secondary pivot when a first abnormal draft force is applied to said tool, (2) said upper and lower sections to pivot as a unit about said main pivot when a second abnormal force is applied to said tool and (3) to pivot said lower section on said upper section to a favorable earth reentry position when said second abnormal draft force is removed, said transmitting means acting to return the tool to the earth working position when either abnormal draft force is removed.

2. An implement as defined in claim 1, in which said biasing means includes at least one spring acting between said main pivot and said toggle linkage for biasing said links to a first position corresponding to the earth working position of said tool.

3. An implement as defined in claim 2, in which said second link is pivotally connected intermediate the ends thereof to said first link with said first link having a stop and said at least one spring is a tension spring having one end connected to said main pivot and the opposite end connected to the free end of said first link to bias said extension into engagement with said stop.

4. An implement as defined in claim 2, in which said first link includes means defining a stop adapted to engage said upper section when said toggle linkage is in the first position and said at least one spring is connected to said main pivot and said first link to maintain said toggle linkage in said first position.

5. An implement as defined in claim 1, in which said biasing means includes at least one spring coacting between said linkage and said member.

6. An implement as defined in claim 1, in which said biasing means includes means operatively connecting said linkage to said member and at least one spring acting on said connecting means to maintain said linkage and said member in a first position and yieldingly allowing said member or said linkage to move from said first position when either abnormal draft force is applied to the tool.

7. In a release and cushioning assembly for yieldingly connecting a tool to a main beam of an implement with said tool having an operative position relative to said beam when normal draft forces are applied to said tool, said assembly comprising an upper section pivotally connected to a main pivot on the main beam adjacent the one end thereof, a transmitting member pivoted on the upper section and having a portion thereof in driving engagement with said end of said beam, a tool supporting lower section pivoted on said upper section on a secondary pivot, a linkage including first and second pivotally interconnected toggle links with said first link connected to said transmitting member and said second link connected to said lower section, and biasing means acting on said toggle links for resiliently retaining said tool in the operative position and yielding to abnormal draft forces on said tool to selectively allow said tool to move relative to the beam by selectively (1) pivoting said upper and lower sections as a unit on said main pivot and (2) pivoting said lower section about said secondary pivot, said biasing means, transmitting member and linkage cooperating to return said assembly to the operative position when said abnormal draft forces are removed.

8. An assembly as defined in claim 7, in which said biasing means includes at least one spring having one end operatively connected to said main pivot and the opposite end operatively connected to at least one of said links for biasing said links to a first position corresponding to the operative position of said assembly.

9. An assembly as defined in claim 7, in which said transmitting member includes an extension, and said biasing means includes a rod having one end connected with one of said extension and said toggle linkage, means defining an aperture on the other of said extension and said toggle linkage and at least one spring acting on said rod and said means defining the aperture to maintain said toggle linkage and transmitting member in a first position corresponding to the operative position of said assembly, said at least one spring having a force which progressively increases as said toggle linkage or said transmitting member is moved from the first position from the abnormal draft forces on the tool to thereby return said assembly to the first position when the abnormal draft forces are removed.

10. An assembly as defined in claim 7, in which said biasing means includes an extension on one of said linkage and said transmitting member, operatively interconnecting said extension and the other of said linkage and said transmitting member, and at least one spring applying a force between said extension and said linkage sufficient to oppose normal draft forces on the tool, said force progressively increasing as a tool is moved from the operative position to thereby return the tool to the operative position when abnormal draft forces are removed.

11. An assembly as defined in claim 7, in which one of said links includes means defining an extension and said biasing means includes at least one spring producing a force between said extension and said main pivot sufficient to oppose normal draft forces on the tool and progressively increasing as said tool is moved from the operative position, said force acting to return the tool to its operative position when abnormal draft forces are removed from the tool.

References Cited

UNITED STATES PATENTS

| 2,312,405 | 3/1943 | Haagen | 172—264 |
| 3,321,027 | 5/1967 | Johnson et al. | 172—266 |
| 3,420,315 | 1/1969 | Roth | 172—265 |

ROBERT E. PULFREY, Primary Examiner

W. J. CONLON, Assistant Examiner

U.S. Cl. X.R.

172—265, 266, 684, 705, 716